Patented Sept. 16, 1924.

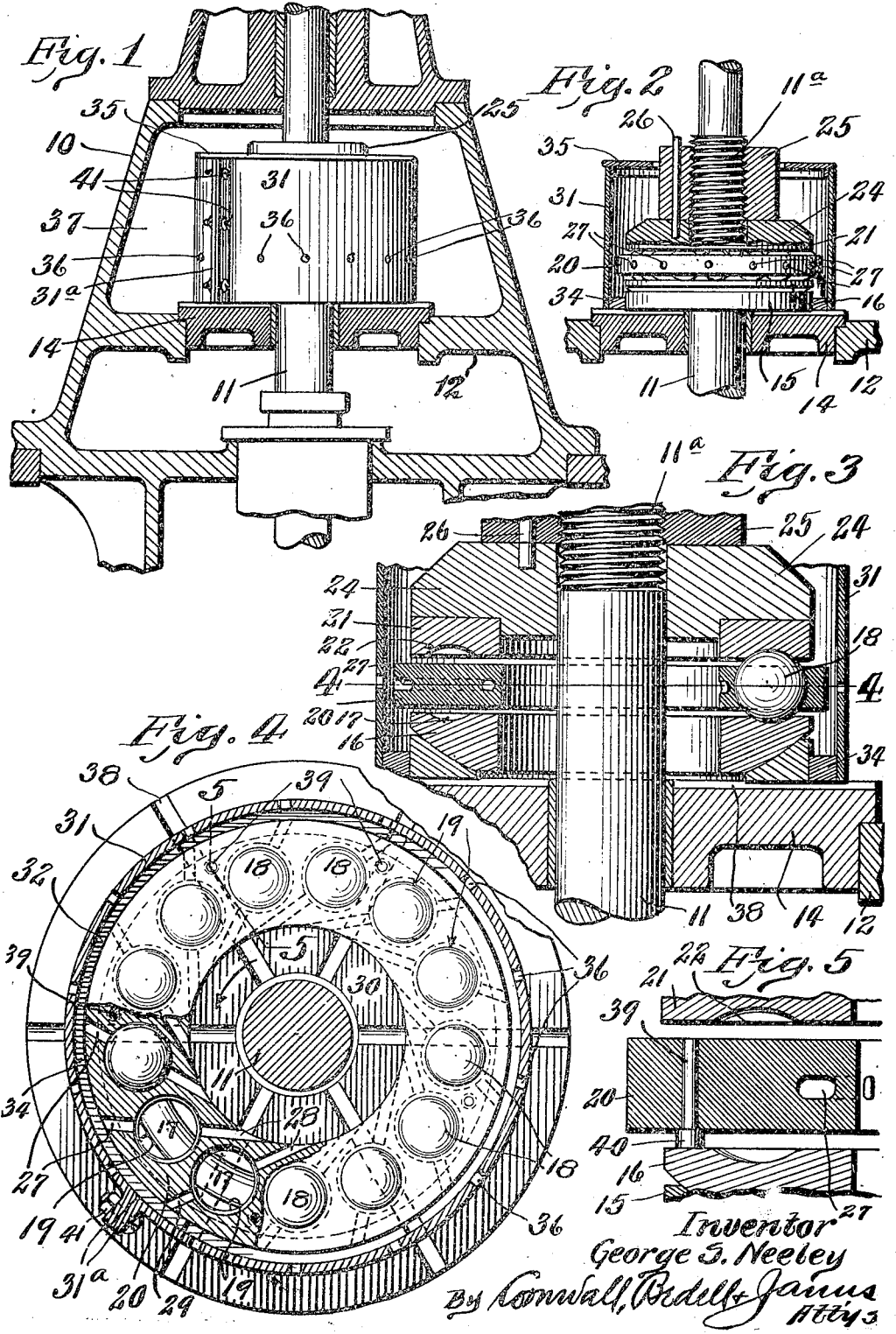

1,508,815

UNITED STATES PATENT OFFICE.

GEORGE S. NEELEY, OF HARTFORD, ILLINOIS, ASSIGNOR OF ONE-HALF TO GRIFFIN WATKINS, OF ALTON, ILLINOIS.

THRUST BEARING.

Application filed August 15, 1923. Serial No. 657,574.

*To all whom it may concern:*

Be it known that I, GEORGE S. NEELEY, a citizen of the United States, residing at Hartford, Madison County, Illinois, have invented a certain new and useful Improvement in Thrust Bearings, of which the following is a specification, such as will enable others skilled in the art to which it appertains to make and use the same.

This invention relates to new and useful improvements in thrust bearings and the objects of the invention are to provide a bearing for high speed mechanism, such as deep well pumps, which is automatically lubricated thereby keeping the rubbing surfaces of the bearing well supplied with the lubricants at all speeds.

Further objects of the invention are to provide a bearing in which the lubricant is not agitated by the rotating parts thereof thereby preventing bubbling or emulsifying of the lubricant.

Still further objects of my invention are to so construct the ball retaining member of the bearing that the lubricant is circulated through the ball recesses of the retaining member by centrifugal action whereby all of the parts of the bearing in which the bearing balls operate are at all times effectually lubricated.

Another object of my invention is to provide a ball retaining member in which the bearing balls contained therein are partially relieved of the supporting pressure between said bearing balls and the bottom ball race member so as to permit the lubricant to enter between the rubbing surfaces thereof.

With these and other objects in view, my invention consists in certain novel features of construction and arrangement of parts hereinafter more fully described and claimed, and illustrated in the accompanying drawings, in which—

Figure 1 is a vertical cross section through the upper end of the discharge head of a pump with my improved bearing shown in side elevation therein.

Figure 2 is a side elevation of the bearing partially in cross section.

Figure 3 is a vertical cross section through the bearing.

Figure 4 is a horizontal cross section taken on line 4—4 of Figure 3.

Figure 5 is a vertical cross section taken on line 5—5 of Figure 4.

The present invention relates to high speed thrust bearings wherein the lubricant is forced into the ball cavities or recesses of the retaining ring so that the bearing balls arranged therein as well as the ball races of the bearing members are supplied with the lubricant which is forcibly circulated by centrifugal action through the ball recesses of the retaining ring.

Heretofore, bearings of the class described were lubricated by oil contained in a suitable housing such as the discharge head and the oil was circulated through said housing by means of a small pump or other extraneous device. The rapid rotation of the revolving parts of the bearing caused the oil to be thrown against the housing and drawn away from the bearing balls and the parts associated therewith by the rapidly revolving members of the bearing. Consequently, such bearings are poorly lubricated and have to be replaced very frequently and sometimes due to this inefficient lubrication, the balls are ground causing the bearing to jamb and break the shaft or do other damage to the machine.

In the lubricating bearing of my improved construction advantage is taken of the centrifugal action to cause the lubricant to be drawn into the ball recesses or pockets formed in the retaining ring from which it is then discharged through suitable passageways formed in said ring and terminating in the outer periphery thereof into a suitable chamber formed by a circular casing stationarily arranged around said bearing and spaced a suitable distance from said retaining ring. The peripheral wall of this casing is provided with apertures through which the oil is discharged into the outer chamber formed by the discharge head and is returned from the outer chamber through suitable channels formed in the ball bearing base, to the central chamber formed by the inner peripheral walls of the retaining ring and the ball race members; to be again forced by centrifugal action through the passageways formed in the retaining ring and communicating with said central chamber to the wall pockets disposed in said retaining member. Thus a satisfactory flow of lubricant to each ball bearing recess is assured and the bearing balls and the raceways in which the latter operate are properly lubricated.

Referring by numerals to the accompanying drawings, 10 designates the upper or discharge head of the frame or support of a pump, and 11 indicates the vertically disposed shaft thereof journaled in suitable bearings in said frame. The lower end of this shaft extends downwardly and is connected in any suitable manner to the pump shaft, not shown, while its upper end is driven in any suitable manner such as a belt and pulley or a vertical motor connected directly to the upper end of said shaft. The discharge head 10 is provided with an inwardly presented annular flange 12 on which is supported a ball bearing base 14 having a central aperture for the accommodation of the upwardly projecting shaft 11. Resting on base 14 is a base ring 15 provided in its upper end with an annular concave face for the reception of a convex portion of bearing ring 16. This ring is provided in its upper face with an annular raceway 17 in which are designed to operate bearing balls 18 arranged for operation in ball pockets 19 formed in retaining ring 20 which serves to maintain said balls in proper spaced relation. A top ball race member 21 having a raceway 22 is arranged above retaining ring 20 and is supported upon bearing balls 18. A bearing ring 24 arranged above ball race member 21 is provided in its lower face with a circular seat for receiving the upper end of ball race member 21. This bearing ring is held in engagement with ball race member 21 and locked against upward movement by a lock nut 25 which is screw seated on the threaded portion 11ª of shaft 11. A lock pin 26 is driven downwardly through lock nut 25 and the lower end of said pin is seated in a suitable recess formed in the upper end of bearing ring 24 thereby securing said lock nut against rotation and accidental displacement. The retaining ring 20 is provided with a series of preferably tangentially disposed oil ducts or passageways 27, which traverse the ball cavities formed in said ring and are thereby divided into inner portions 28 which terminate in the inner periphery of said retaining ring and outer portions 29 which terminate in the outer periphery of said ring. The inner periphery of the ring is spaced a suitable distance from shaft 11, thereby forming an inner or central chamber 30 and the outer periphery of ring 20 is spaced a suitable distance from the circular casing 31 so as to form a circular intermediate chamber 32 with which the outer ends of oil ducts 27 communicate.

The lower end of circular casing 31 is closed by means of a circular flange 34 which projects inwardly from the lower end of casing 31 and forms a tight fit with the outer peripheral wall of base ring 15. The upper end of casing 31 is closed by a suitable cover 35 having a central opening for the accommodation of shaft 11 and lock nut 25. Casing 31 is provided at spaced intervals with openings 36 which are circumferentially arranged in said casing preferably on a level with the oil ducts 27 and serve to maintain the level of the lubricant contained within the housing at the proper height by discharging the surplus oil from said housing into the outer chamber 37 formed by casing 31 and discharge head 10. The oil in chamber 37 is allowed to return into the central chamber 30 by way of channels 38 formed radially in the upper face of bearing base member 14. In order to partially support the retaining ring 20 on ring 16 and partially relieve the bearing balls 18 of the pressure so that the race ways 17 and said bearing balls may be properly lubricated said retaining ring is provided with a series of pins 39 which are seated therein and have their lower ends projecting downwardly and outwardly from the lower face of said ring and resting on the upper face of ball race members 16 as shown in Figure 5.

For the purpose of assemblage, casing 31 is preferably formed split and the split ends thereof are flanged outwardly as indicated at 31ª and are clamped together by suitable fastening devices 41.

In the operation of the device, assuming the shaft rotates in the direction indicated by arrow in Figure 4, the oil contained in the tangentially disposed passageways 27 is discharged therefrom into the intermediate chamber 32 by centrifugal action whereupon the oil contained in the central chamber 30 enters said passageways through the inner ends thereof which terminate in the inner periphery of the retaining ring. The oil in traversing the inner portions 28 of passageways 27 enters the cavities in which the bearing balls 18 operate thereby lubricating the same and is then discharged through the outer portions 29 into the intermediate chamber 32. When the level of oil contained in said intermediate chamber reaches the openings 36, said oil is discharged from chamber 32 into the outer chamber 37 which acts as a reservoir chamber and permits the oil contained therein to cool off so that the temperature of the oil during the operation of the pump does not rise very much. The oil discharged from the central chamber 30 through the tangentially disposed passageways to bores 27 is replaced by fresh oil from reservoir chamber 37 by means of channels 38. Thus a steady circulation of oil through the tangentially disposed bores is accomplished by centrifugal action and the ball cavities in which the bearing balls operate as well as the raceways of the ball race members are kept well supplied with lubricant. The casing 31 which is stationary is spaced from retaining ring 20 only a sufficient distance to provide the necessary operating clearance and a restricted intermediate chamber so that the oil may be properly discharged through the apertures 36. Thus the large body of lubricant contained in outer chamber 37 is separated by said casing 31 from the rapidly rotating parts of the bearing and the bubbling or emulsifying of the lubricant is thereby prevented.

I claim:

1. A thrust bearing comprising a pair of oppositely disposed ball race members, a ball bearing retaining member interposed therebetween, and a casing enclosing said members and spaced therefrom, said retaining member being provided with a series of bores extending therethrough each of said bores being disposed at an angle to the radius of said maintaining member whereby the lubricant is caused by centrifugal action to be discharged outwardly through said bores when said retaining member is rotated.

2. A thrust bearing comprising a pair of oppositely disposed annular ball race members, a ball bearing retaining member operatively arranged therebetween and provided with a series of tangentially disposed bores each of which is in communication with a corresponding bearing ball pocket of said retaining member, and a stationary member spaced from and enclosing ball bearing members, said enclosing member being provided with a plurality of apertures for permitting the lubricant to be discharged therefrom.

3. A vertical thrust bearing comprising a pair of opposed ball race members, a ball bearing retaining member disposed therebetween and provided with a series of bearing ball pockets and a corresponding series of oil passageways traversing said pockets and terminating in the outer periphery of said ring each of said passageways being disposed at an angle to the radius of the axis of the bearing, and a perforate casing enclosing said ball bearing.

4. A thrust bearing comprising a pair of opposed ball race members, a ball bearing retaining member arranged therebetween and provided with a series of bearing ball pockets and a corresponding series of tangentially disposed passageways which traverse said pockets and have their outer end terminating in the outer periphery of said retaining member, a casing spaced from and enclosing said members thereby separating said bearing from the outer or lubricant reservoir chamber, and a stationary support for said bearing and provided with channels for establishing communication between said respective chambers, said casing being provided with a plurality of openings for establishing communication between said chambers a suitable distance above said channels.

5. A vertical thrust bearing comprising in combination with a vertically disposed shaft, a stationary support, a bottom ball race member arranged on said support, a retaining ring provided with bearing balls supported on said bottom ball race member, a top ball race member supported above said retaining ring, means arranged on said shaft and resting on said top ball race member, and means in said ring, said means being tangentially disposed in said ring for conveying the lubricant by centrifugal action away from the shaft through the pockets in which the bearing balls operate thence discharging said lubricant adjacent to the outer periphery of said ring.

6. A vertical thrust bearing comprising a stationary support, a bottom ball race member supported thereon, a retaining ring, bearing balls arranged in said ring and operating in said ball race member, means arranged on the lower face of said ring for supporting said ring on said ball race member independently of said bearing balls, and a top ball race member operatively arranged on said bearing balls and supporting said shaft in operative position.

7. A vertical thrust bearing comprising a stationary support, a bottom ball race member supported thereon, a ball bearing retaining ring arranged above said bottom ball race member, supporting pins depending from said ring and resting on said bottom ball race member, and a top ball race member operatively supported on said ball bearing retaining ring.

8. A vertical thrust bearing comprising a stationary housing, a pair of opposed ball race members arranged in said casing, a retaining ring arranged between said ball race members and provided with a series of recesses, bearing balls arranged in said recesses and operating in the raceways of said members, a series of passageways tangentially disposed in said ring and communicating with said ball recesses and having their ends terminating in the inner and outer peripheries of said ring whereby when said ring is operated the lubricant is forced by centrifugal action through said passageways to said ball pockets and is then discharged through the outer ends of said passageways.

9. A vertical thrust bearing comprising a stationary housing, ball race members arranged in said housing, a ball bearing retaining ring operatively arranged between said ball race members and provided with tangentially disposed passageways extending from the inner to the outer peripheries of said ring and traversing the pockets in which the balls operate, and a circular casing enclosing said ball bearing members and forming in said housing an inner or ball bearing lubricant chamber and an outer or reservoir lubricant chamber, there being apertures formed in said casing for discharging the lubricant from the inner chamber to the outer chamber, and means for returning the lubricant from the outer chamber to the inner chamber.

10. A vertical thrust bearing comprising in combination with a stationary support, and a vertically disposed shaft, a pair of oppositely disposed ball race members, and a ball retaining ring having a series of pockets for receiving the bearing balls, said ring being provided with tangentially disposed passageways arranged cooperatively with the direction of rotation of said shaft whereby the circulation of lubricant through said passageways and said ball pockets is maintained by centrifugal action.

11. A vertical thrust bearing comprising in combination with a stationary support and a vertically disposed revoluble shaft, a pair of oppositely disposed ball race members, a ball retaining ring having a series of ball pockets arranged therein and a corresponding series of tangentially disposed bores traversing said pockets whereupon lubricant is forced through said bores and said pockets by centrifugal action, and a circular casing arranged therearound for separating the revoluble parts of the bearing from the lubricant contained in the reservoir chamber formed in said support, there being apertures formed in said casing to allow the passage of the lubricant discharged from said bores outwardly into said reservoir chamber.

12. A vertical thrust bearing comprising in combination with a stationary support and a vertically disposed revoluble shaft, a pair of oppositely disposed ball race members, a ball retaining ring having a series of ball pockets arranged therein, and a corresponding series of tangentially disposed bores traversing said pockets whereby lubricant is forced through said bores and said pockets by centrifugal action, a circular casing arranged therearound for separating the revolving parts of the bearing from the lubricant contained in the reservoir chamber formed in said support, there being apertures formed in said casing to allow the passage of the lubricant discharged from said bores outwardly into said reservoir chamber, and means formed in said support and below said casing for returning the oil from said reservoir chamber inwardly to the chamber in which said ball bearing operates.

13. In a thrust bearing, a housing, a ball bearing including a ball retaining ring provided with tangentially disposed bores arranged in said housing, and a stationary circular casing spaced from said retaining ring and separating said housing into an inner lubricant chamber containing said ball bearing and an outer lubricant reservoir chamber, there being apertures formed in said casing for permitting the discharge of the lubricant from said inner chamber to said outer chamber.

14. In a thrust bearing, a housing, a ball bearing including a ball retaining ring provided with tangentially disposed bores arranged in said housing, and a stationary circular casing spaced from said retaining ring and separating said housing into an inner lubricant chamber containing said ball bearing and an outer lubricant reservoir chamber, there being apertures formed in said casing for permitting the discharge of the lubricant from said inner chamber to said outer chamber, and passageways formed in said housing for conveying the lubricant from the outer chamber to said inner chamber.

In testimony whereof I hereunto affix my signature this 13th day of August, 1923.

GEORGE S. NEELEY.